United States Patent [19]

Baba

[11] 4,439,803
[45] Mar. 27, 1984

[54] POWER INTERRUPTION DEVICE

[75] Inventor: Sadaaki Baba, Aichi, Japan

[73] Assignee: Mitsubishi Denki Kabushiki Kaisha, Tokyo, Japan

[21] Appl. No.: 326,622

[22] Filed: Dec. 2, 1981

[30] Foreign Application Priority Data

Dec. 5, 1980 [JP] Japan .............................. 55-174562[U]

[51] Int. Cl.³ .............................................. H02H 7/26
[52] U.S. Cl. ........................................ 361/63; 361/67; 361/94; 361/58; 361/104
[58] Field of Search ..................... 361/63, 62, 65, 64, 361/66, 67, 95, 96, 93, 94, 58, 104

[56] References Cited

U.S. PATENT DOCUMENTS

| | | | |
|---|---|---|---|
| 2,439,165 | 4/1948 | Graves, Jr. | 361/63 |
| 2,488,745 | 11/1949 | Stratton | 361/63 X |
| 2,920,241 | 1/1960 | Jacobs, Jr. et al. | 361/63 |
| 3,070,728 | 12/1962 | Edmunds | 361/63 |
| 4,240,123 | 12/1980 | Hotta | 361/63 X |

Primary Examiner—Patrick R. Salce
Attorney, Agent, or Firm—Sughrue, Mion, Zinn, Macpeak & Seas

[57] ABSTRACT

A current transformer and current sensing relay are used to determine the maximum conduction time of the main interrupter in a power circuit. The operating time of the current sensing relay is less than that of the main interrupter but greater than that of a plurality of branch interrupters.

3 Claims, 5 Drawing Figures

POWER INTERRUPTION DEVICE

BACKGROUND OF THE INVENTION

This invention relates to an improvement in a power interrupting device of the type including a main interrupter, i.e. circuit breaker, connected to a power source and branch interrupters which are connected to the main interrupter through a current limiting circuit which, in turn, includes a permanent fuse and a parallel resistor.

A conventional power interrupting device of this type is as shown in FIG. 1. In the power interrupting device, the resistance of a parallel resistor R is so selected that very little current flows in the resistor R. During normal operation, current flows through a main interrupter M, primarily through a permanent fuse PF, and through branch interupters F1, F2 . . . and Fn to respective loads. Therefore, when a short-circuit problem occurs in the circuit of any one of the branch interrupters, the permanent fuse PF forming a part of the current limiting circuit becomes extremely high in resistance owing to the high problem current Ipros, thus, starting current limitation. As a result, the value of the problem current is limited by the permanent fuse PF to a limit current peak value Ipfc as shown in FIG. 3. In this case, as the current continues to flow the resistance of the permanent fuse PF becomes higher than that of the parallel resistor R. Therefore, the problem current flows through both the parallel resistor R and the permanent fuse PF, so that a current Ipfr flows as a steady state current. Accordingly, if the current Ipfr flowing in the current limiting circuit is set to 10 to 20 KA, then a main interrupter M and branch interrupters $F_i$ having an interruption capacity of slightly less than the current limit of 10 to 20 KA can be used as those effectively having an interruption capacity of 200 KA as shown in FIG. 2. Since the tripping time of the main interrupter M is delayed, selective interruption can be carried out, and the selective interruption can be effected for large currents.

In the conventional device, the complete interruption time of the main interrupter M must be longer than that of the branch interrupter Fn and shorter than the allowable current flow time of the current limiting circuit (or the permanent fuse PF) and the parallel resistor R. The complete interruption time of an ordinary wiring interrupter is very short, however, and does not provide sufficient time for the selective interruption. Accordingly, in order to employ such a wiring interrupter as the main interrupter in the device, the wiring interrupter must be modified to increase the complete interruption time. Because of this difficulty, a special wiring interrupter must be employed.

On the other hand, if an ordinary air circuit breaker is employed, then sufficient time is available for the selective interruption with the branch interrupter Fn to be carried out, because the complete interruption time of the air circuit breaker is longer. However, since the complete interruption time of the air circuit breaker is longer than the allowable current flow time of the current limiting circuit, the air circuit breaker must be modified to decrease its complete interruption time. Accordingly, it is necessary to use a special air circuit breaker in this case.

In either case, it is technically and economically difficult to develop and obtain such a special wiring interrupter or a special air circuit breaker.

SUMMARY OF THE INVENTION

In view of the foregoing, an object of this invention it to provide a power interrupting device which can readily carry out the current limitation and the selective interruption but requires no special circuit breaker for the main interrupter.

Briefly, this is accomplished by providing a current transformer in series with the current limiting circuit with the current through the transformer being sensed by a current sensing relay. The relay controls a trigger circuit which acts to interrupt the main circuit breaker. The activation time of the relay is longer than that of the branch circuit breakers but shorter than the maximum allowable current flow time of the current limiting circuit, so that the main breaker will be triggered at the proper time without the use of a specially modified breaker.

DETAILED DESCRIPTION OF THE PREFERRED EMBODIMENTS

Figure 1:
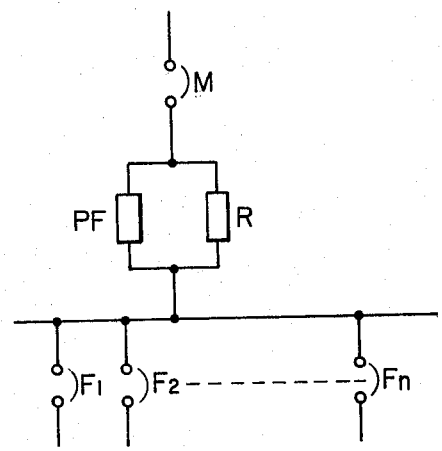
FIG. 1 is a circuit diagram showing a conventional power interrupting device.
Figure 2:
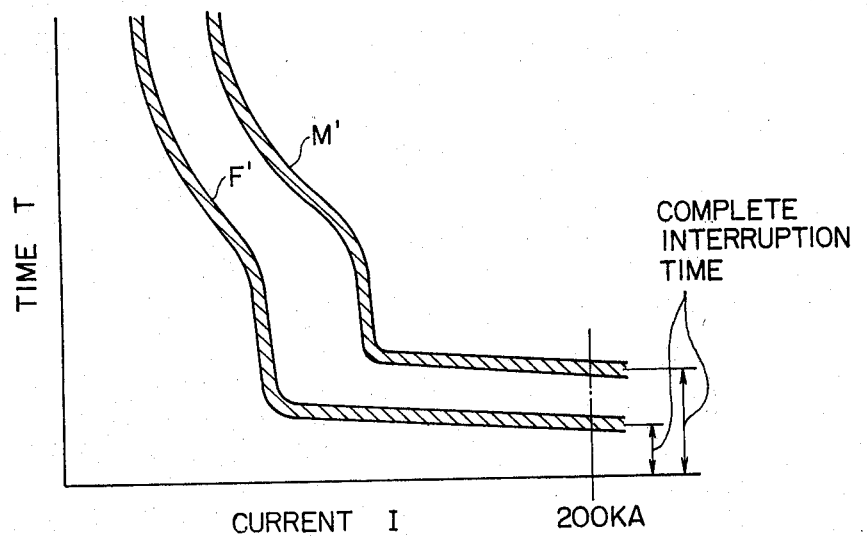
FIG. 2 is a graphical representation indicating the operating characteristic of the conventional device in FIG. 1.
Figure 3:
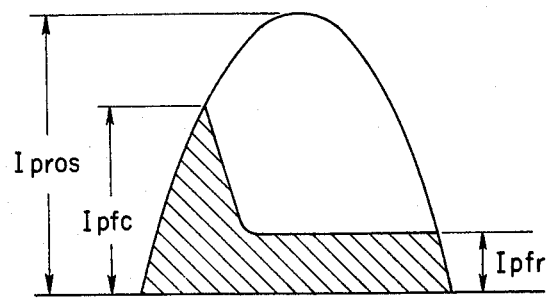
FIG. 3 is an explanatory diagram showing a problem current flowing in a current limiter.
Figure 4:
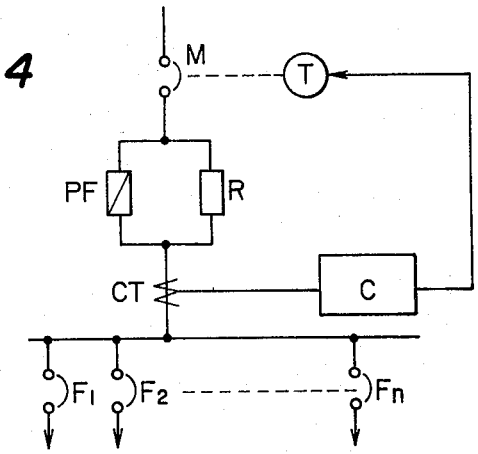
FIG. 4 is a circuit diagram showing one example of a power interrupting device according to this invention.
Figure 5:
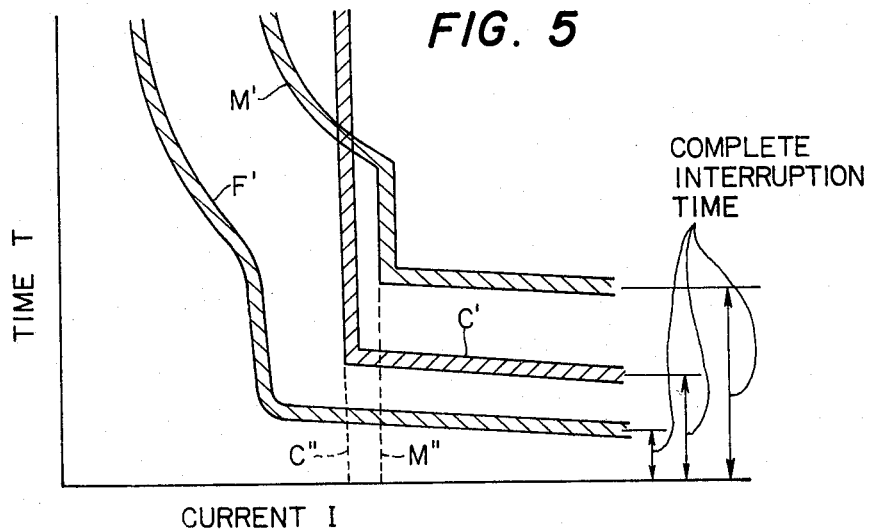
FIG. 5 is a graphical representation indicating the operating characteristic of the device in FIG. 4.

One embodiment of this invention will be described with reference to FIGS. 4 and 5. In FIG. 4, reference character M designates a main interrupter; T, the tripping unit of the main interrupter M; PF, a permanent fuse; R, a parallel resistor; CT, a current transformer; C, a relay for detecting the current of the current transformer CT, to operate the tripping unit (coil) T; and F1, F2, . . . and Fn, wiring branch interrupters, respectively. In FIG. 5, reference character F' designates the operating characteristic of the branch interrupters F1 through Fn; M', the operating characteristic of the main interrupter M; and C', the operating characteristic of the relay C.

In the device thus organized, during normal operation, current flows through the main interrupter M and the permanent fuse PF and through the branch interrupters F1, F2, . . . and Fn to respective loads. When a short-circuit problem occurs in the circuit of the branch interrupter F1, the phase of an internal element, e.g. sodium, forming the permanent fuse which, in turn, forms a part of a current limiting circuit, is changed from solid phase through liquid phase to gas phase by the problem current Ipros. As a result, the permanent fuse PF, now providing a very high resistance, begins current limitation. In this operation, the resistance of the permanent fuse PF becomes higher than that of the parallel resistor R, and accordingly the problem current flows through both the parallel resistor R and the permanent fuse PF; that is, a steady state current Ipfr flows.

This current is interrupted by the branch interrupter F1, and the main interrupter M is not activated. Accordingly, the power is continuously supplied to the other branch interrupters F2 through Fn whose circuits are operating properly. Thus, it can be seen that a selectively interruptable power supply device has been provided.

In this device, the operating characteristic of the main interrupter M is as shown in FIG. 5; that is, the main interrupter M has a relatively long time limit characteristic, and also has a short time limit operating current M" which is larger than the minimum operating current C" of the current detecting relay C, and a complete interruption time longer than that of the current detecting relay C. Thus, the main interrupter M is so designed that at large current values it will not operate more quickly than the current detecting relay C.

The current detecting relay C is operated by the current which is detected by the current transformer CT. The relay C has the short time limit characteristic C' such that at high current values the interruption F will operate before the relay C. Therefore, the relay C will not operate if the problem current is interrupted by the branch interrupter F1, but it will operate before the allowable current flow time of the main interrupter M, permanent fuse PF and parallel resistor R elapses if the problem current continues to flow for a longer period of time. This will operate the tripping unit T of the main interrupter M to cause the main interrupter M to interrupt the problem current.

As is apparent from the above description, according to this invention, the main interrupter M with the tripping unit is coupled to the current detecting relay C. Therefore, the tripping unit T of the main interrupter M can be operated by the output of the current detecting relay C. Thus, in the employment of an ordinary interrupter, if an appropriate current detecting relay is selected or designed, then it is unnecessary to provide a special operating characteristic for the interrupter. This results in considerable cost savings since it is less expensive to obtain a relay having the appropriate characteristics than it is to modify a circuit breaker. Thus, the power interrupting device according to this invention can be readily realized, and is low in manufacturing cost and high in reliability.

What is claimed is:

1. A power interrupting device of the type having a main interrupter connected in series between a power source and at least one branch interrupter, and a current limiting circuit connected in series between said main interrupter and at least one branch interrupter for limiting the maximum value of current flowing through said main interupter to substantially a predetermined current value, each of said main and branch interrupters having respective maximum time limits for which they will conduct a particular current before interrupting said current, the time limit of said main interrupter being greater than that of said at least one branch interrupter, and said current limiting circuit having a maximum allowable time for which it can conduct a particular current, the improvement comprising:

operating means for operating said main interrupter in response to a control signal to cause said main interrupter to interrupt current flowing therethrough; and sensing means for sensing the current flowing through said main interrupter, said sensing means comprising a current transformer coupled in series between said current limiting circuit and said at least one branch interrupter and a current sensing relay for sensing the current through said current transformer, and said sensing means providing said control signal after a maximum time limit of sensed current at said particular current level, the time limit of said sensing means being between that of said main interrupter and at least one branch interrupter for any current value up to said predetermined current value and less than said maximum allowable time limit of said current limiting circuit for any current up to said predetermined current value.

2. A power interrupting device as claimed in claim 1, wherein said at least one branch interrupter comprises a plurality of interrupters which are not in series with one another but are each in series with said main interrupter.

3. A power interrupting device claimed in claim 1, wherein said current limiting circuit comprises a parallel connection of a resistor and a permanent fuse.

* * * * *